(12) United States Patent
Ryu

(10) Patent No.: US 8,607,291 B2
(45) Date of Patent: Dec. 10, 2013

(54) METHOD, AV CP DEVICE AND HOME NETWORK SYSTEM FOR EXECUTING AV CONTENT WITH SEGMENT UNIT

(75) Inventor: Won-ho Ryu, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1143 days.

(21) Appl. No.: 11/844,678

(22) Filed: Aug. 24, 2007

(65) Prior Publication Data

US 2008/0050096 A1  Feb. 28, 2008

Related U.S. Application Data

(60) Provisional application No. 60/840,044, filed on Aug. 25, 2006.

(30) Foreign Application Priority Data

Mar. 14, 2007  (KR) .................. 10-2007-0025143

(51) Int. Cl.
*H04N 7/173* (2011.01)
*H04N 5/445* (2011.01)

(52) U.S. Cl.
USPC ............... 725/116; 725/115; 725/92; 725/93; 725/41

(58) Field of Classification Search
USPC .................... 725/38, 91–92, 41, 93, 115–116
See application file for complete search history.

(56) References Cited

U.S. PATENT DOCUMENTS

| | | | |
|---|---|---|---|
| 6,370,316 B1 | 4/2002 | Yamada et al. | |
| 6,438,596 B1 * | 8/2002 | Ueno et al. | 709/226 |
| 6,711,741 B2 | 3/2004 | Yeo | |
| 6,850,978 B2 * | 2/2005 | Springmeyer et al. | 709/224 |
| 7,685,616 B2 * | 3/2010 | Virdi et al. | 725/38 |
| 2003/0126603 A1 * | 7/2003 | Kim et al. | 725/38 |
| 2004/0243700 A1 | 12/2004 | Weast | |
| 2005/0033758 A1 * | 2/2005 | Baxter | 707/100 |
| 2005/0135341 A1 * | 6/2005 | Kim | 370/352 |
| 2006/0089981 A1 * | 4/2006 | Ahn et al. | 709/221 |
| 2006/0218251 A1 * | 9/2006 | Tanabe | 709/220 |
| 2007/0118873 A1 * | 5/2007 | Houh et al. | 725/136 |
| 2007/0199037 A1 | 8/2007 | Matsuzaki et al. | |

FOREIGN PATENT DOCUMENTS

| | | |
|---|---|---|
| CN | 1115949 A | 1/1996 |
| EP | 0690626 A2 | 1/1996 |
| JP | 2005-182778 A | 7/2005 |
| KR | 10-2006-0001554 A | 1/2006 |

(Continued)

OTHER PUBLICATIONS

Communication from the Japanese Patent Office dated Aug. 23, 2011, in counterpart Japanese Application No. 2009-525505.

(Continued)

*Primary Examiner* — Jason J Chung
*Assistant Examiner* — Sumaiya A Chowdhury
(74) *Attorney, Agent, or Firm* — Sughrue Mion, PLLC

(57) ABSTRACT

Provided are a method, an audio/video (AV) control point (CP) device, and a home network system for executing AV content in segment units defined using a protocol enabling interoperability between various devices existing in a home network. The method includes a control point extracting segment-related information about audio/video (AV) content stored in a first AV device, and the control point controlling a second AV device to execute the AV content using the segment-related information in segment units.

28 Claims, 10 Drawing Sheets

(56) References Cited

FOREIGN PATENT DOCUMENTS

| KR | 102006-0047691 A |   | 5/2006  |
|----|------------------|---|---------|
| WO | 2005/112452 A1   |   | 11/2005 |
| WO | WO 2005-112452   | * | 11/2005 |

OTHER PUBLICATIONS

Communication issued on Dec. 27, 2011 by the Intellectual Property Office of the P.R. of China in the corresponding Chinese Patent Application No. 200780031546.1.

* cited by examiner

FIG. 7

| METADATA | DESCRIPTION |
|---|---|
| segment | Name or title of segment |
| segment@creator | Creator of segment |
| segment@type | highlight, summary, preview... |
| segment@keywords | List of keywords related to segment |
| segment@segmentLocator | Start time and length of segment |
| segment@keyFrameLocator | Start time of key frame of segment |

FIG. 8

```xml
<DIDL-Lite xmlns="urn:schemas-upnp-org:metadata-1-0/DIDL-Lite/" xmlns:dc="http://purl.org/dc/elements/1.1/" xmlns:upnp="urn:schemas-upnp-org:metadata-1-0/upnp/">
<item id="RecoredVideo20060206_09_2100" restricted="true">
<upnp:class>object.item.videoItem</upnp:class>
<dc:title>KBS 9 p.m. News</dc:title>
<dc:creator>KBS</dc:creator>
<dc:date>2006-02-06</dc:date>
<upnp:genre>news</upnp:genre>
<dc:language>Korean</dc:language>
<upnp:recordedDayOfWeek>MON</upnp:recordedDayOfWeek>
<res protocolInfo="http-get:*:audio/mpeg:*" duration="0:45:48">http://10.88.164.142/UPnPMediaServer/CDS/Video/RV20060206_09_2100.avi</res>
<upnp:segment creator="KBS" type="Summary, Highlight" keywords="headline" segmentLocator="0:00:00, 0:00:58" keyFrameLocator="0:00:00">headline</upnp:segment>
<upnp:segment creator="KBS" type="Highlight" keywords="snow weather accidents" segmentLocator="0:00:59, 0:04:16" keyFrameLocator="0:00:59">Snow covers the whole country, Series of accidents and flight cancellations occur</upnp:segment>
<upnp:segment creator="KBS" keywords="traffic, icy road" segmentLocator="0:05:15, 0:06:20" keyFrameLocator="0:05:15">There will be ice here and there on the roads. Expected to cause problems for commuters getting to work</upnp:segment>
<upnp:segment creator="KBS" keywords="jeonbook, heavy snow alert" segmentLocator="0:11:35, 0:03:33" keyFrameLocator="0:11:35">Jeollabukdo Province, Heavy snow warning. More snow expected to peak at 15cm tomorrow</upnp:segment>
<upnp:segment creator="KBS" keywords="weather" segmentLocator="0:15:08, 0:05:25" keyFrameLocator="0:15:08">Tomorrow getting colder and more snow expected</upnp:segment>
<upnp:segment creator="KBS" type="Highlight" keywords="Samsung, donation" segmentLocator="0:20:33, 0:07:27" keyFrameLocator="0:20:33">Samsung donated a ₩8,000 billion gift as public welfare fund</upnp:segment>
<upnp:segment creator="KBS" keywords="finance" segmentLocator="0:28:00, 0:08:14" keyFrameLocator="0:28:00">[In-depth report]Crippled by financial burden and lack of facilities</upnp:segment>
<upnp:segment creator="KBS" keywords="kidnap, family" segmentLocator="0:28:14, 0:06:04" keyFrameLocator="0:28:14">[Saturation coverage ] Family of the kidnapped to North Korea faces double whammy</upnp:segment>
<upnp:segment creator="KBS" keywords="low-birthrate, population" segmentLocator="0:34:18, 0:08:10" keyFrameLocator="0:34:18">[Series ] Solutions to low birth weight problem? From pregnancy to childbirth</upnp:segment>
<upnp:segment creator="KBS" type="Highlight" keywords="Diana" segmentLocator="0:42:28, 0:03:20" keyFrameLocator="0:42:28">[Global village]Laser beam, irradiated to Diana's driver</upnp:segment>
</item>
</DIDL-Lite>
```

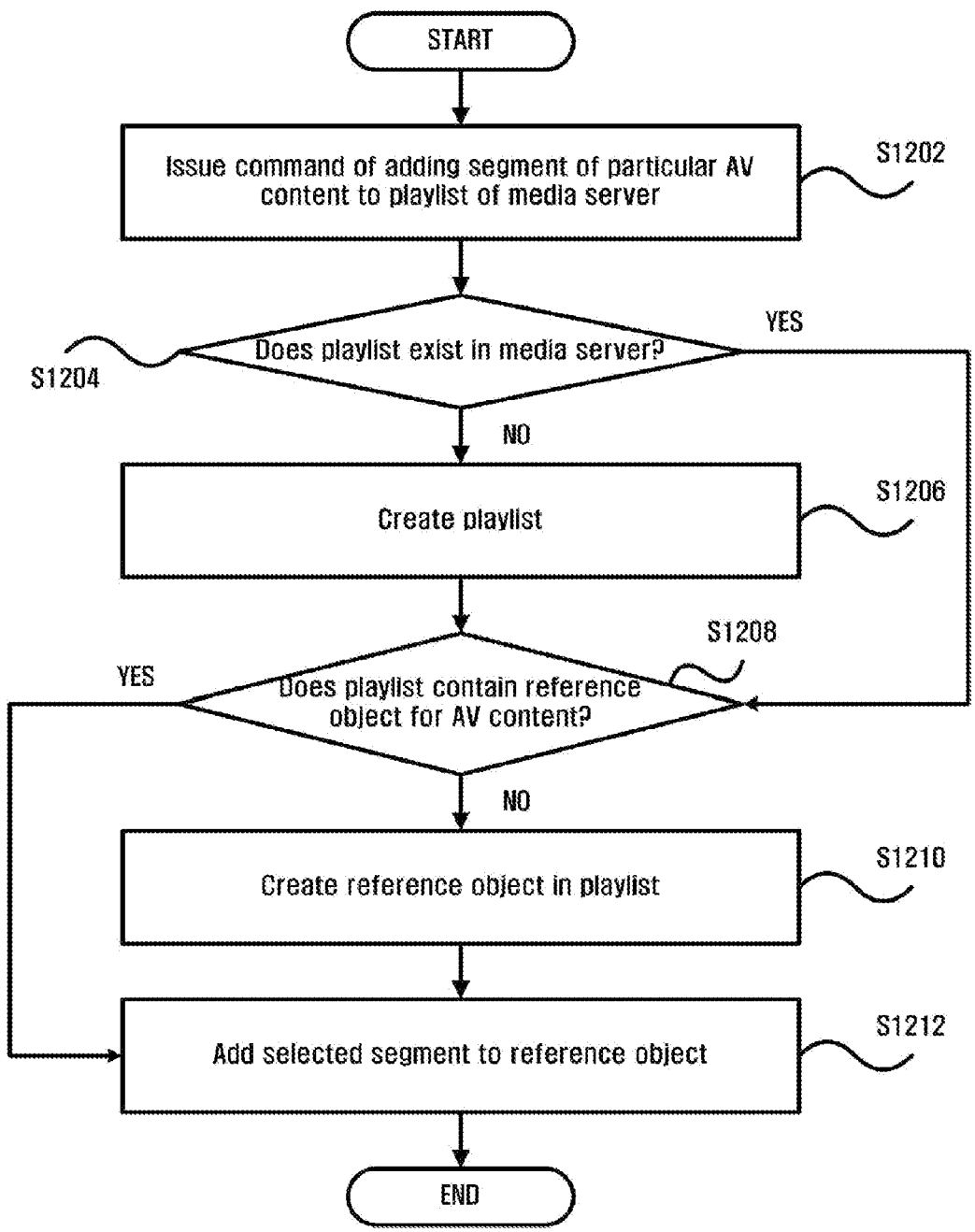

METHOD, AV CP DEVICE AND HOME NETWORK SYSTEM FOR EXECUTING AV CONTENT WITH SEGMENT UNIT

CROSS-REFERENCE TO RELATED APPLICATION

This application claims priority from U.S. Provisional Application No. 60/840,044 filed on Aug. 25, 2006 in the USPTO and Korean Patent Application No. 10-2007-0025143 filed on Mar. 14, 2007 in the Korean Intellectual Property Office, the disclosure of which are incorporated herein by reference in its entirety.

BACKGROUND OF THE INVENTION

1. Field of the Invention

The present invention relates to home network technology, and more particularly, to a method, an audio/video (AV) control point (CP) device, and a home network system for executing AV content in segment units defined using a protocol enabling interoperability between various devices existing in a home network.

2. Description of the Related Art

In general, a home network is implemented as a private network based on an Internet Protocol (IP). A variety of machines such as all types of personal computers (PCs), intelligent devices, and wireless devices, which are used within a home, are connected and controlled through the home network based on a virtual common computing environment referred to as middleware. Middleware connects various digital devices through a peer-to-peer network so that the digital devices can communicate with each other. Home Audio/Video Interoperability (HAVI), Universal Plug and Play (UPnP), Java intelligent network infra-structure (Jini), Home Wide Web (HWW), etc. have all been suggested as middleware.

A UPnP network defines a UPnP device and UPnP service by protocols established between the UPnP device and UPnP service. The UPnP network includes a controlled device (CD) that is connected to an IP-based home network and controlled, and a control point (CP) that controls a number of controlled devices. Specifically, the control point requests and receives events. The controlled device performs functions as requested by the control point. When the state of the controlled device changes, the controlled device informs the CP of its state change so that the CP can continue to request events.

UPnP AV technology, which is based on UPnP technology, can handle audio, video and other multimedia content, as described in the UPnP AV Specification. This will be described with reference to FIG. 1 showing a schematic diagram of a UPnP AV architecture.

According to the UPnP AV Specification, a first AV device, AV device 1, which is a media server 20, contains AV content and stores various image files and audio/video files through a CDS (Content Directory Service).

Here, the CDS is a service embedded into the media server 20 and provides the AV CP 10 with metadata describing the content existing inside or outside a home network or stored in the media server 20. Examples of the media server 20 include a hard disk drive (HDD), a flash memory device, a personal computer (PC) incorporating an optical device such as a DVD/CD, a set-top box (STB), a DVD playback unit, an MP3 playback unit, a DSC (Digital Still Camera), and so on.

A second AV device, AV Device 2, which is a media renderer 30, allows a user to be offered AV content, including DTV (Digital TV), Hi-Fi audio, monitor, and so on. AV Device 2 receives the AV content from AV Device 1, that is, the media server 20, through an Out-of-Band transport protocol.

The AV CP 10 is a module for processing a user's command. In order to perform the user command, the AV CP 10 calls appropriate UPnP actions through the media server 20 or the media renderer 30. The AV CP 10 may be implemented within a user input device such as a remote control, or may be implemented within the media server 20 or the media renderer 30.

FIG. 2 is a diagram illustrating a procedure for executing AV content using the conventional UPnP AV architecture shown in FIG. 1. In order to identify a list of AV content present in the media server 20, first, the AV CP 10 fetches a list of metadata for the AV content present in the media server 20 by calling a Browse/Search( ) action and displays the same on a screen in operation S12. If a user selects a particular AV content item and issues a playback command to the media renderer 30, the AV CP 10 calls a GetProtocolInfo( ) action from the media renderer 30 to request protocol information, and the media renderer 30 provides the AV CP 10 with protocol information as requested, so that the AV CP 10 can identify whether or not the media renderer 30 is a device capable of playing back the corresponding content in operation S14. The AV CP 10 compares the protocol information from the media renderer 30 with the protocol information from the media server 20 in operation S16. If it is determined that the protocol information from the media renderer 30 is the same as the protocol information from the media server 20, AVTInstanceID is obtained by calling the PrepareForConnection( ) action of the media server 20 in operation S18. Likewise, AVTransportID and RCSInstanceID are obtained by calling a PrepareForConnection( ) action of the media renderer 30 in operation S20. RCSInstanceID is used to control the volume, color, brightness, or the like of the media renderer 30. The selected content is played back by calling a SetAVTransportURI( ) action of the media server 20 or the media renderer 30. Here, URI information of the content to be played back is transmitted as an argument in operation S22.

If a user presses a playback button, the media server 20 or the media renderer 30 having called the SetAVTransport URI( ) action calls a Play( ) action in operation S24. In a case where the Play( ) action of the media renderer 30 is called, the media renderer 30 requests a file corresponding to URI information transmitted through the SetAVTransportURI( ) action to the media server 20, or in a case where the Play( ) action of the media server 20 is called, the media server 20 transmits an AV content file corresponding to the URI set through the SetAVTransportURI( ) action to the media renderer 30 in operation S26. In this case, useful examples of protocols for streaming actual content include HTTP, RTP, IEEE1394, and so on. In the course of streaming content, various playback control actions may be called, including Seek( ), Stop( ), Pause( ), and so on. In addition, in order to control the volume, color, brightness, or the like, of the playback device, various actions of the media renderer 30, which are related to RCS, may be called. When the playback of the corresponding content is completed, the AV CP 10 calls a TransferComplete( ) action to notify the media server 20 or the media renderer 30 of the completion of the playback in operation S28. If the TransferComplete( ) action is called, the media server 20 and the media renderer 30 cancel resources allocated for the corresponding connection.

However, it is not possible to identify content present on the media server 20 in a predetermined segment unit using a CDS (Content Directory Service) with existing UPnP AV protocols, or to play back the content in a particular selected segment. In other words, the content played back with the existing UPnP AV protocols may have the following problems:

First, a user cannot browse or navigate content in segments. Second, a particular segment of content cannot be selectively played back. Third, a particular segment cannot be selectively bookmarked to be played back at a later time. Fourth, a playlist including predetermined segments of content cannot be created or played back.

SUMMARY OF THE INVENTION

The present invention provides a method, an audio/video (AV) control point (CP) device, and a home network system for executing AV content in segment units in a home network, by which segments of the AV content can be represented, the AV content can be searched for in units of segment, a selected segment can be played back, a particular segment can be bookmarked, and a playlist including segments of AV content can be created.

The above and other objects of the present invention will be described in or be apparent from the following description of the preferred embodiments.

According to an aspect of the present invention, there is provided a method for executing AV content in segment units, the method including a control point extracting segment-related information about audio/video (AV) content stored in a first AV device and controlling a second AV device to execute the AV content using the segment-related information in segment units.

According to another aspect of the present invention, there is provided a control point device for executing AV content in segment units, the control point device including a segment searching unit, which in a case where the AV content extracted from a media server includes segment-related information, searches for a plurality of segments constituting the AV content, and a segment playback unit playing back the desired segments by controlling the media server and a media renderer.

According to still another aspect of the present invention, there is provided a home network system for executing AV content in segment units, the home network system including a media server storing AV content in segment units, a media renderer executing the AV content in segment units, and a control point including a segment searching unit, which in a case where the AV content extracted from a media server includes segment-related information, searches for a plurality of segments constituting the AV content, and a segment playback unit playing back the searched segments by controlling the media server and the media renderer.

BRIEF DESCRIPTION OF THE DRAWINGS

The above and other features and advantages of the present invention will become more apparent by describing in detail preferred embodiments thereof with reference to the attached drawings in which:

FIG. 7 illustrates metadata needed for executing AV content in segment units according to an embodiment of the present invention and descriptions thereof;

FIG. 8 is an exemplary illustration of metadata representing AV content in segment units through a content directory service (CDS) of a media server according to an embodiment of the present invention;

FIG. 12 is a diagram illustrating a procedure of generating a playlist including predetermined segments of AV content and adding a segment to the playlist, according to a fourth embodiment of the present invention.

DETAILED DESCRIPTION OF THE INVENTION

Figure 1:
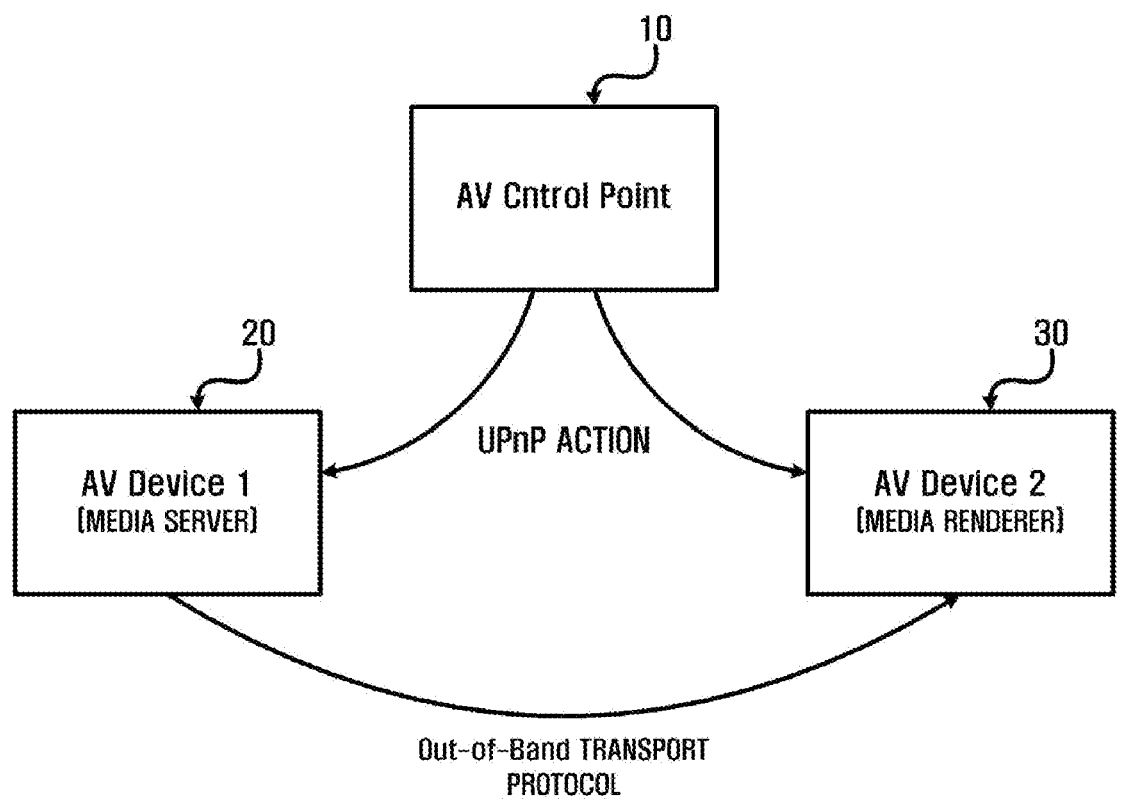
FIG. 1 is a schematic diagram of a conventional UPnP AV architecture.
Figure 2:
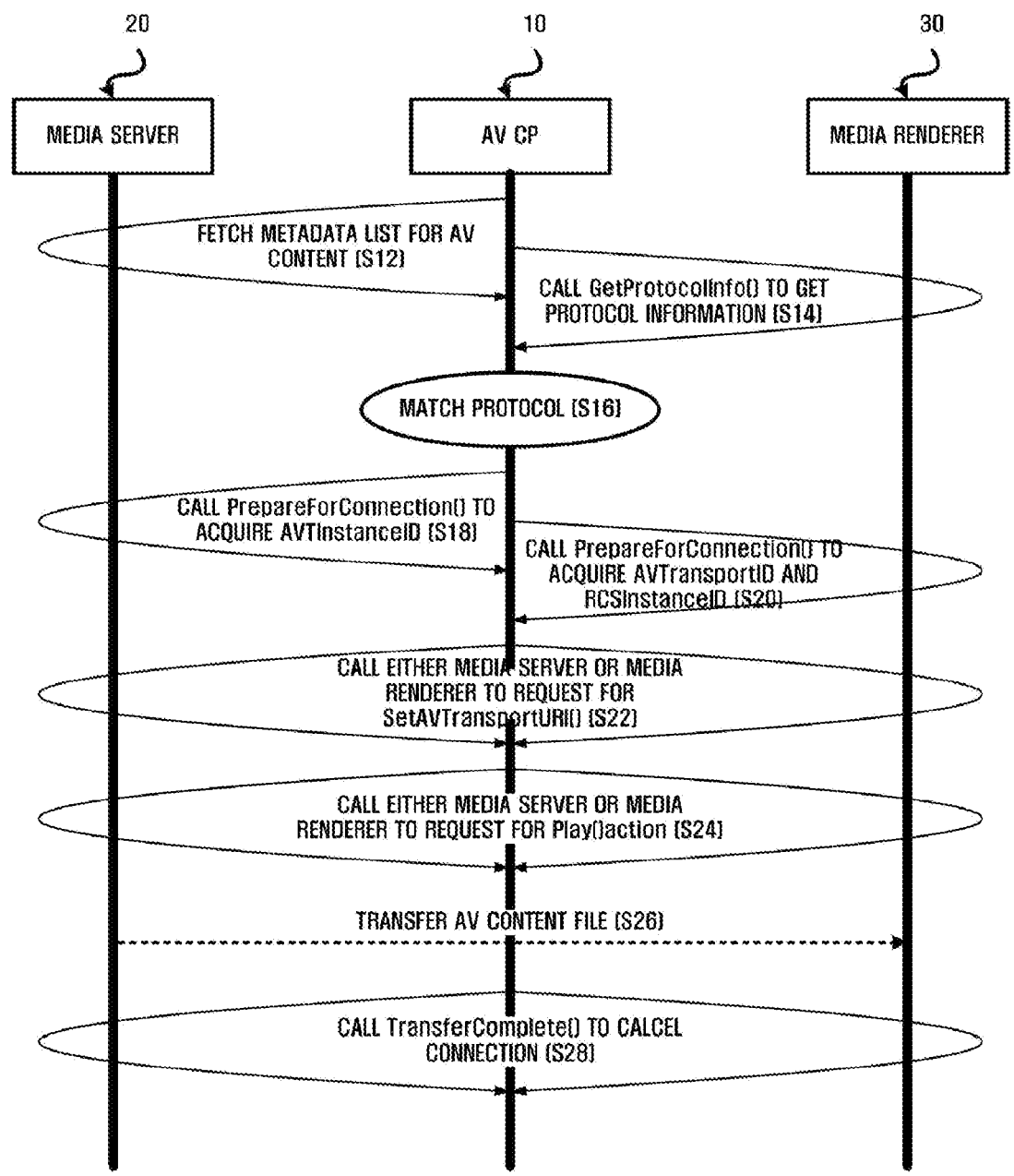
FIG. 2 is a diagram illustrating a procedure for executing AV content in the conventional UPnP AV architecture shown in FIG. 1.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Hereinafter, the invention will be described in detail with reference to blocks or flowcharts explaining a method, an audio/video (AV) control point (CP) device, and a home network system, for executing AV content predefined according to preferred embodiments of the present invention, in segment units. For convenience of explanation, the invention will now be described with regard to a UPnP AV architecture allowing users to enjoy AV content based on the UPnP (Universal Plug and Play) technology and the names of devices for implementing the present invention will mainly be the same as those used in the UPnP AV specification. However, it will be apparent to those skilled in the art that the scope of the present invention is not restricted to the exemplary UPnP AV architecture and names described herein.

Figure 3:
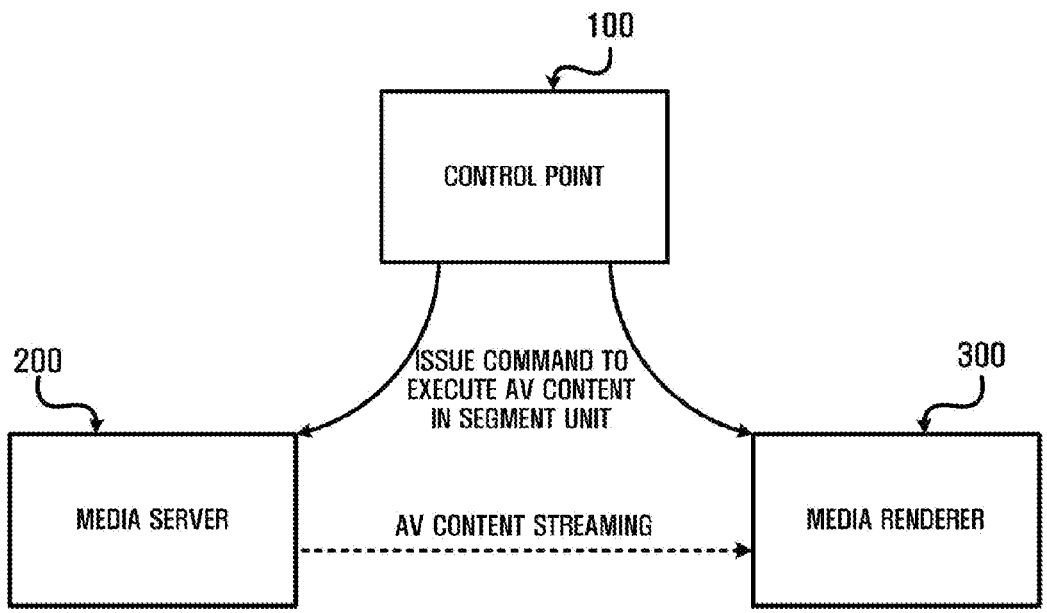
FIG. 3 is a schematic diagram of a UPnP AV system for executing AV content in a segment unit according to an embodiment of the present invention.

FIG. 3 is a schematic diagram of a UPnP AV system for executing AV content in segment units according to an embodiment of the present invention. Referring to FIG. 3, the UPnP AV system includes a control point 100, a media server 200, and a media renderer 300.

The control point 100 receives from a user a command for search, playback, creation of a bookmark, or creation of a playlist of AV content in segment units, and to perform the command calls various services offered by the media server 200 and/or the media renderer 300. The control point 100 may be implemented as a stand-alone device, such as a remote controller, or may be mounted on a device including the media server 200 or the media renderer 300. The control point 100 will be described in detail with reference to FIG. 4.

Figure 4:
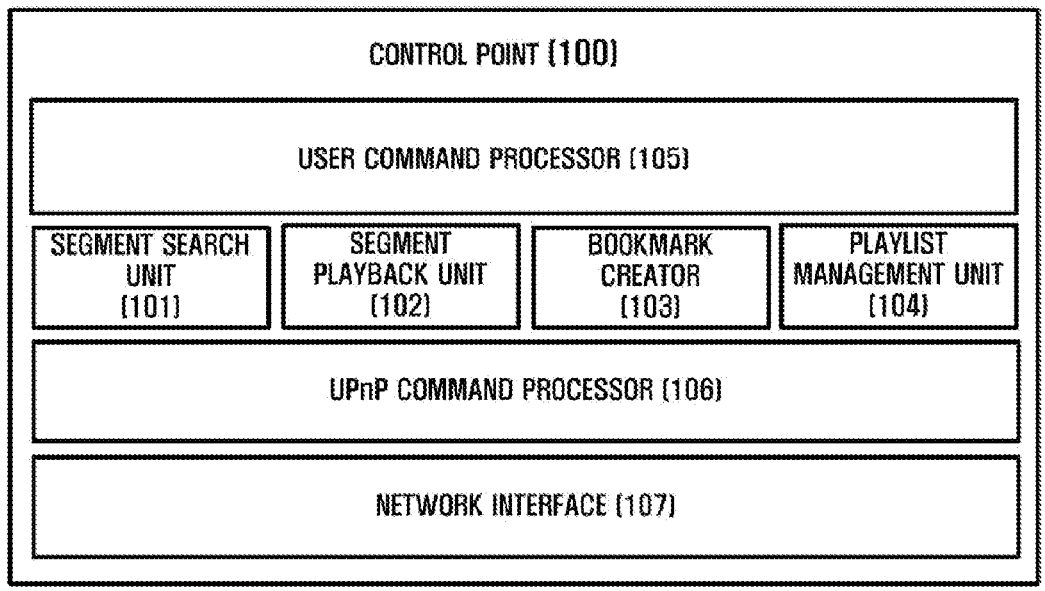
FIG. 4 is a schematic diagram of a control point device for executing AV content in segment units according to an embodiment of the present invention.

Referring to FIG. 4, the control point 100 includes a segment search unit 101, a segment playback unit 102, a bookmark creator 103, a playlist management unit 104, a user command processor 105, a UPnP command processor 106, and a network interface 107. In a case where the AV content extracted from the media server 200 includes segment related information, that is, in a case where the AV content consists of a plurality of segments, the segment search unit 101 searches for segments chosen by a user. A search operation in segment units is performed by extracting at least one of several types of information, including key frame information which is information about a representative image in a segment, keyword information which is information about keywords used in or describing a segment, start position information of a segment, and length information of a segment. Here, the segment-related information (as illustrated in FIG. 7) refers to information about a "segment" element having a value representing a particular segment title. The "segment" element has various attributes, including a creator, a type, keywords, a segmentLocator, and a keyFrameLocator, which will later be described with reference to FIG. 7. The segment playback unit 102 controls the media server 200 and the media renderer 300 to call services required for playback, thereby playing back the searched segment. In other words, URI (Uniform Resource Identifier) information for the AV content containing a segment to be played back, and start position information of the segment in the AV content are extracted from the media server 200 and then transmitted to the media renderer 300. The media renderer 300 executes the segment using the URI information and the start position information. Here, the expression "to execute the segment" means not only to play the segment but also to stop, pause, and seek through the segment. In addition, the expression "to execute the segment" means to display only segments with a certain "type" attribute, including Highlight, Summary or Preview attributes, if the user commands the control point to do so.

The bookmark creator 103 calls the media server 200 to request the addition or deletion of bookmark information about a particular segment of interest so that a user may store the particular segment and return to that segment for later playback. The bookmark information is created by setting a type value of a segment element by an UpdateObject( ) command defined by the CDS of the media server 200.

The playlist management unit 104 creates a playlist including one or more segments selected by a user in the media server 200, or adds a new segment to the created playlist. In other words, if a playlist exists in the media server 200, it is determined whether or not a reference object for the AV content item including the new segment that the user intends to add to the playlist already exists. If it is determined that the reference object already exists, the segment is added to the reference object, and if not, the reference object is first created and the segment is then added to the created reference object.

The user command processor 105 supplies the user with a user interface (UI) screen so that the user can search for AV content on the media server 200 and issue various commands. Whenever the user issues a command, the user command processor 105 calls a function of a module required to execute the command.

The UPnP command processor 106, which is a module for calling various types of UPnP services supplied by the media server 200 and the media renderer 300 in an RPC (Remote Procedure Call) form, creates various data packets for executing an RPC, and processes the result of calling the UPnP service.

The network interface 107 is a module for exchanging data packets through the 802.3 or 802.11 network interfaces.

Figure 5:
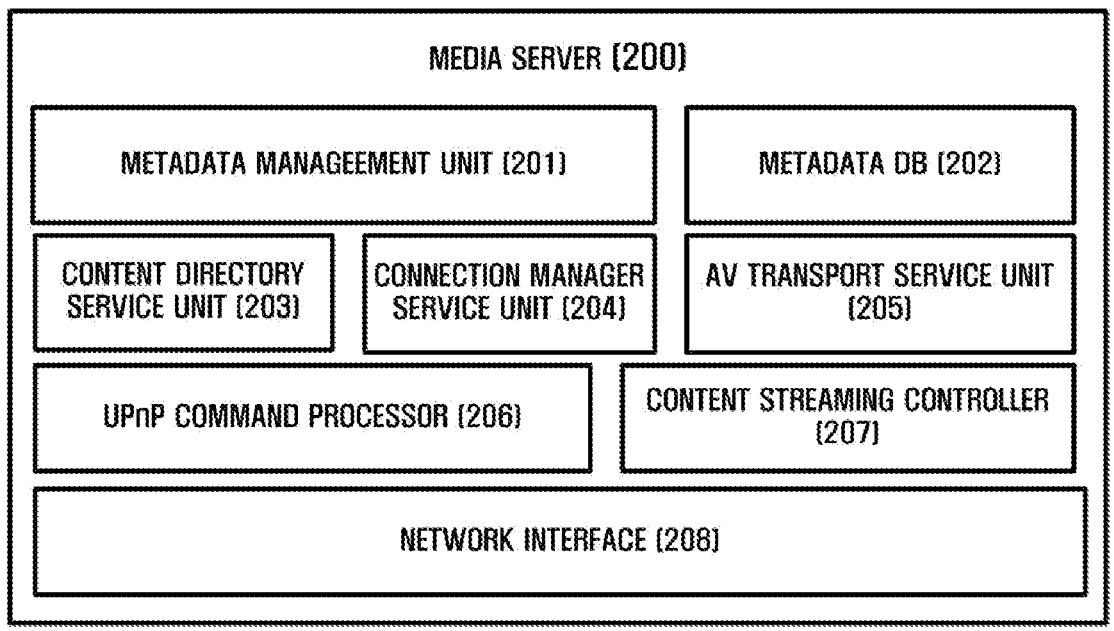
FIG. 5 is a schematic diagram of a media server according to an embodiment of the present invention.

FIG. 5 is a schematic diagram of a media server 200 according to an embodiment of the present invention. The media server 200 includes various types of AV content, and stores the AV content in units of segments, a segment being a unit constituting the AV content. The media server 200 also supplies various types of UPnP service required to allow the media renderer 300 to play back the AV content. Referring to FIG. 5, the media server 200 includes a metadata management unit 201, a metadata DB 202, a CDS unit 203, a connection manager service (CMS) unit 204, an AV transport service unit 205, a UPnP command processor 206, a content streaming controller 207, and a network interface 208.

The metadata management unit 201 collects segment-related information to be stored in the metadata DB 202, and reflects added, deleted, or changed data of the segment related information, if any, in the metadata DB 202 to update the information.

The metadata DB 202 supplies the segment-related information, which is metadata for multiple AV content items, in the form of a database (DB), which will later be described with reference to FIG. 7.

The CDS unit 203 searches for the segment-related information and supplies the control point 100 with the desired information through a predetermined protocol to allow the control point 100 to add, delete, or change the segment-related information. The protocol enables the AV content stored in the media server 200 to be executed by the media renderer 300, and examples thereof include RDP (Remote Desktop Protocol), HTTP, XHT, and the like.

The connection manager service (CMS) unit 204 confirms whether the control point 100 supports a protocol required to play back a particular content item or segment. If protocols and file formats between the media server 200 and the media renderer 300 are identical to each other, the CMS unit 204 creates a connection required for the playback operation and notifies the control point 100 of an individual ID controlling the corresponding connection. Then, the control point 100 is capable of controlling the corresponding connection through the connection ID.

The AV transport service unit 205 allows the control point 100 to execute the particular content or segment between the media server 200 and the media renderer 300.

The UPnP command processor 206 initializes various UPnP actions in the CDS unit 203, the CMS unit 204 and the AV transport service unit 205, transfers the initialized actions to the corresponding units through a network, and analyzes the results of the UPnP actions for processing.

The content streaming controller 207, which streams a particular content item or segment to the media renderer 300, provides control options such as altering streaming speed, and stopping or resuming playback. Examples of useful streaming protocols include HTTP, RTP, IEEE1394, and so on.

The network interface 208 is a module for exchanging data packets through the 802.3 or 802.11 network interfaces.

Figure 6:
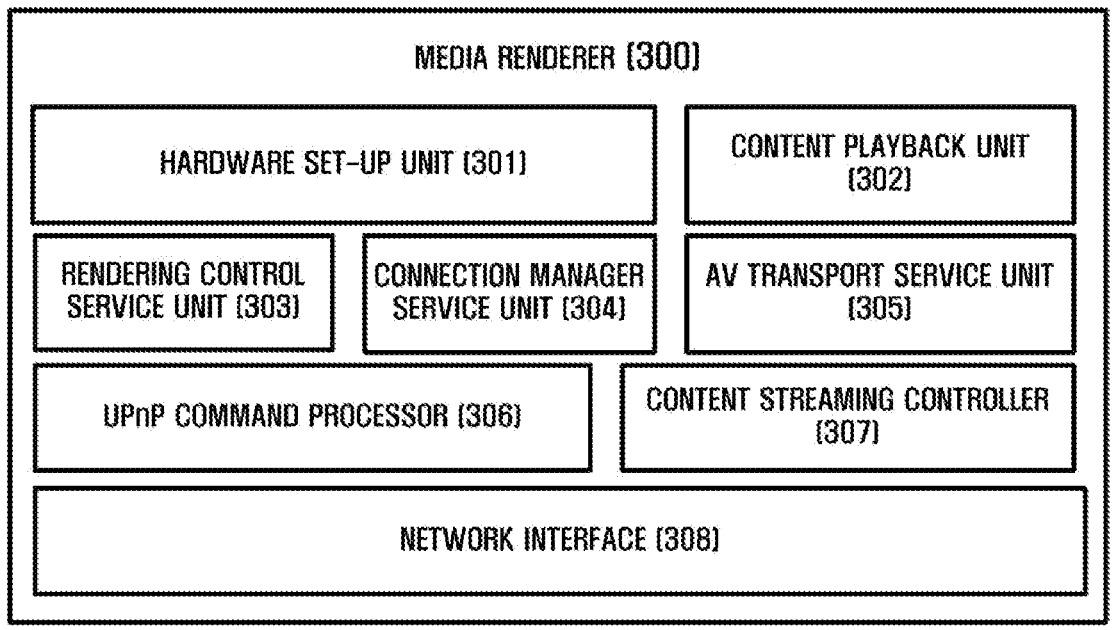
FIG. 6 is a schematic diagram of a media renderer according to an embodiment of the present invention.

FIG. 6 is a schematic diagram of a media renderer 300 according to an embodiment of the present invention. The media renderer 300 supplies various UPnP services for executing the AV content stored in the media server 200 shown in FIG. 5 in segment units. The media renderer 300 includes a hardware set-up unit 301, a content playback unit 302, a rendering control service unit 303, a CMS unit 304, an AV transport service unit 305, a UPnP command processor 306, a content streaming controller 307, and a network interface 308.

The hardware set-up unit 301 adjusts the volume, brightness or color value of a content-output hardware device.

The content playback unit 302 decodes the segment data of the AV content streamed from the media server 200 so as to be played back in the hardware output device.

The rendering control service unit 303 allows the control point 100 to control various parameters of the hardware set-up unit 301, e.g., volume, brightness, color, and the like. In other words, the UPnP command called by the control point 100 is transferred to the hardware set-up unit 301 through the Rendering Control Service (RCS) to adjust various parameters.

The CMS unit 304 confirms whether the control point 100 supports a protocol required to play back a particular content item or segment. If protocols and file formats between the media server 200 and the media renderer 300 are identical to each other, the CMS unit 304 creates a connection required for the playback and notifies the control point 100 of an individual ID capable of controlling the corresponding connection. Then, the control point 100 is capable of controlling the corresponding connection through the connection ID.

The AV transport service unit 305 allows the control point 100 to execute the particular content item or segment between the media server 200 and the media renderer 300.

The UPnP command processor 306 initializes various types of UPnP actions in the CDS unit 203, the CMS unit 204, and the AV transport service unit 205, transfers the initialized actions to the corresponding units through a network, and analyzes results of the UPnP actions for processing.

The content streaming controller 307, which streams a particular content item or segment to the media renderer 300, provides control options such as altering streaming speed, and stopping or resuming playback. Examples of useful streaming protocols include HTTP, RTP, IEEE1394, and so on. The network interface 308 is a module for exchanging data packets through the 802.3 or 802.11 network interfaces.

Meanwhile, the term 'module', as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute on one or more computers in a communication system.

FIG. 7 illustrates metadata needed for executing AV content in segment units according to an embodiment of the present invention and descriptions thereof.

According to the UPnP AV specification, video content in the CDS of the media server 200 is represented as a "videoItem" object.

In order to represent the video content in segment units, a definition of an element of a "segment" is used in a "videoItem" class in the present invention. The "segment" element has a name or title value representing the corresponding segment.

In addition, the "segment" element may have attributes "creator", "type", "keywords", "segmentLocator" and "keyFrameLocator". The "creator" attribute indicates a person or organization that created the segment-related information. One AV content item may have different kinds of segments offered by two or more enterprises and distinguished by creator. The "type" attribute indicates a group to which the corresponding segment belongs, and may have "highlight", "summary", or "preview" as its attribute value. If the segments having "highlight" attributes as "type" value are continuously played back, highlight playback of the corresponding AV content is enabled. The "keywords" attribute has keywords related to the corresponding segment as its attribute value. For example, the "keywords" attribute may be used when a user intends to search for only video segments related to a singer "A". In the corresponding AV content, the "segmentLocator" attribute is described as start time and duration of the corresponding segment. The "keyFrameLocator" attribute is described as a URL that is capable of fetching a representative image of the corresponding segment.

An exemplary representation of AV content in segment units using the above-described segment attributes is shown in FIG. 8. FIG. 8 is an exemplary illustration representing AV content in segment units through a content directory service (CDS) of a media server according to an embodiment of the present invention.

Referring to FIG. 8, KBS 9 p.m. News is represented by 10 independent segments, and each segment is represented using various attributes including "creator", "type", "keywords", "segmentLocator" and "keyFrameLocator".

A procedure of searching for AV content in segment units, selectively playing back and bookmarking a particular segment, and creating a playlist will now be described with reference to FIGS. 9 through 12.

Figure 9:
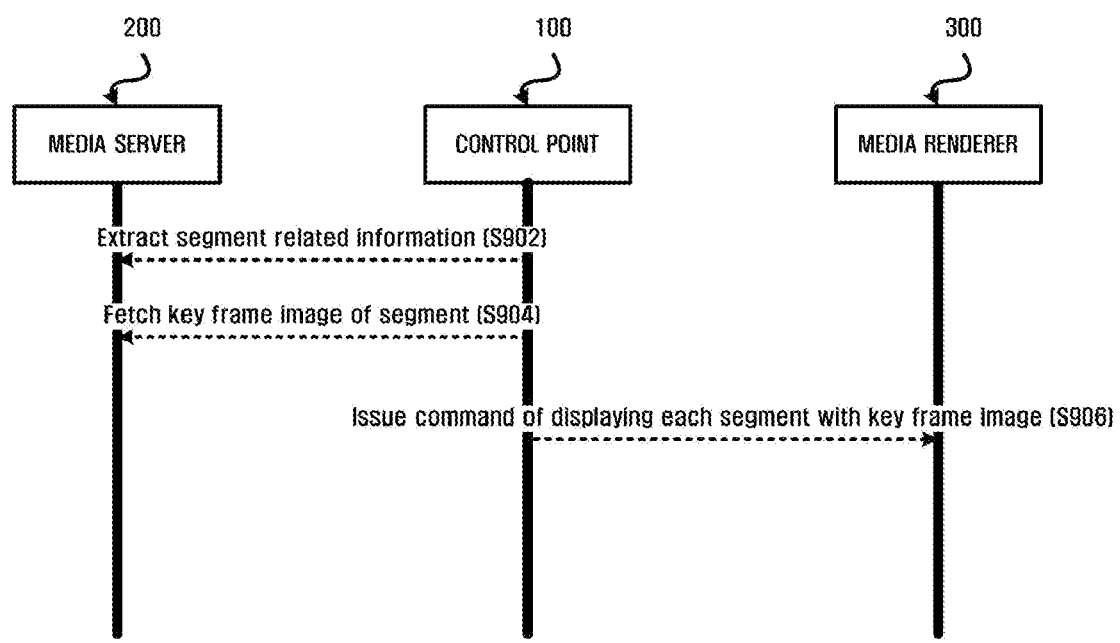
FIG. 9 is a diagram illustrating a procedure of searching for and displaying AV content in segment units according to a first embodiment of the present invention.

FIG. 9 is a diagram illustrating a procedure of searching for and displaying AV content in segment units according to a first embodiment of the present invention.

The control point 100 extracts AV content information and segment related information for the AV content from the media server 200 in operation S902. Here, among various commands of the CDS function, a browse or search command is used. In the course of calling such commands, the "segment" is necessarily included in a filter so as to be transmitted with the segment-related information. Here, the expression "segment-related information" used herein means information about a "segment" element having a value representing a particular segment name of the AV content to be executed by the user and information about various attributes, including "creator", "type", "keywords", "segmentLocator" and "keyFrameLocator".

After the control point 100 extracts the segment-related information from the media server 200, the control point 100 fetches a key frame image from each segment using URI information included in the keyFrameLocator in each segment in operation S904. In operation S906, the control point 100 controls the media renderer 300 to arrange and display various segments in a time sequence together with the key frame image.

Figure 10:
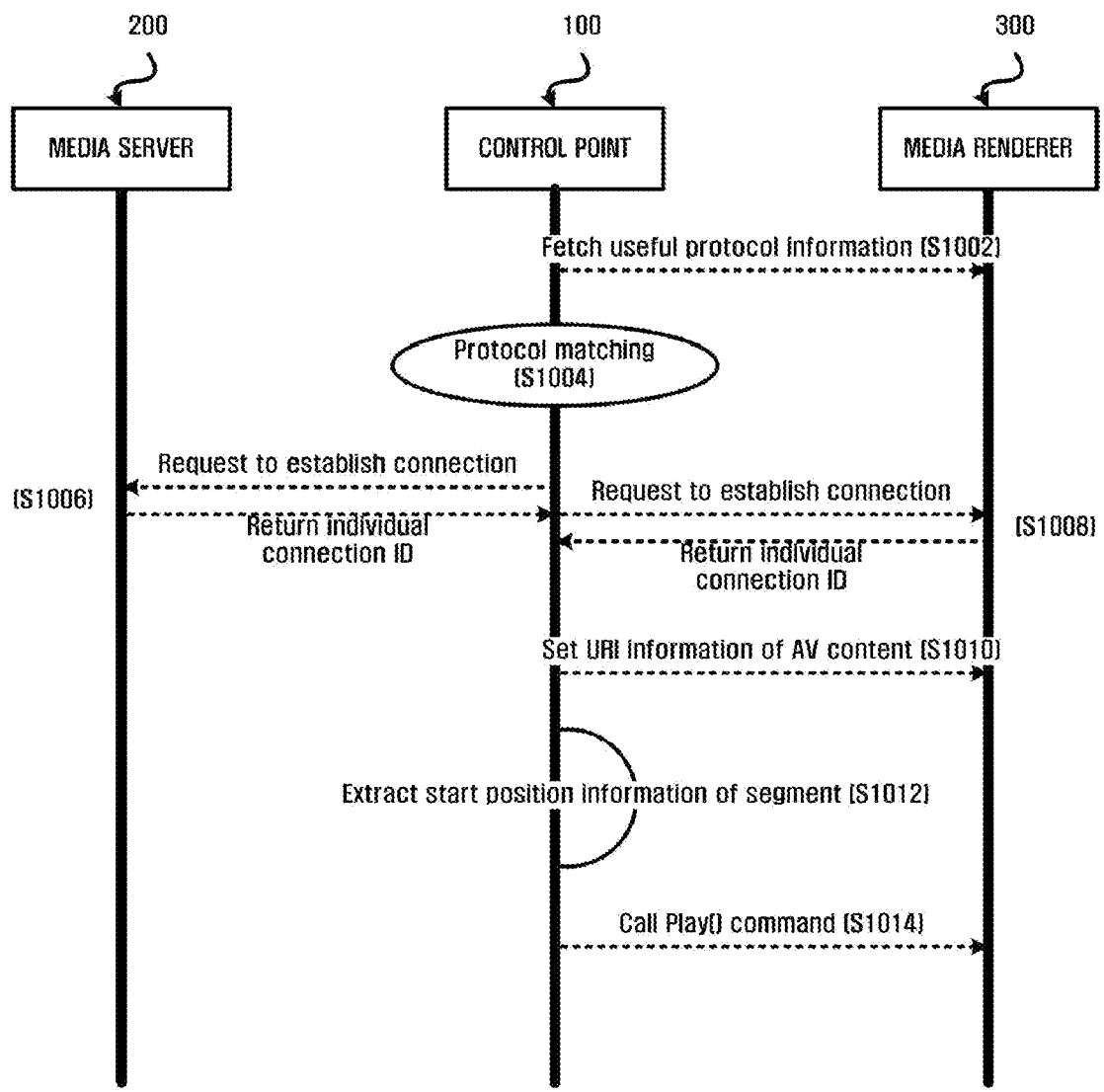
FIG. 10 is a diagram illustrating a procedure of selecting and playing back a predetermined segment of AV content according to a second embodiment of the present invention.

FIG. 10 is a diagram illustrating a procedure of selecting and playing back a predetermined segment of AV content according to a second embodiment of the present invention;

The control point 100 fetches protocol information useful for playing back the AV content from the media renderer 300 in operation S1002. If it is determined in operation S1004 that the media renderer 300 is able to support a protocol and a file format required to play back the currently selected content, the control point 100 sends requests for connections for content playback to the media server 200 and the media renderer 300 in operation S1006, and the media server 200 and the media renderer 300 return individual connection IDs to the control point 100 in operation S1008. The control point 100 controls the playback of the AV content using the IDs. The control point 100 extracts the URI information of the AV content to be played back and transfers the same to the media renderer 300 from the media server 200, in operation S1010. While FIG. 10 illustrates that the URI information is transferred only to the media renderer 300, the control point 100 may control the URI information to be transferred to the media server 200 as well. After extracting start position information of a selected segment in operation S1012, the control point 100 sends the media renderer 300 a command to receive the segment at a corresponding position from the media server 200 and calls a Play( ) command for playing back the segment in operation S1014.

Meanwhile, assuming that highlights of AV content are defined as a group of segments, the procedure illustrated in FIG. 10 is somewhat modified, thereby enabling the highlights of AV content to be played back. In other words, the same steps are performed up to operations S1010 of FIG. 10, and then the control point 100 checks whether segments of the AV content selected to be played back are highlight segments or not. If the "type" attribute value is set to "highlight" or the "keyword" attribute includes the word "highlight", it may be determined that the corresponding segment is a highlight segment. If it is determined that the corresponding segment is a highlight segment, playback is performed through the procedure illustrated in FIG. 10. If it is determined that the corresponding segment is not a highlight segment, the segments are continuously checked to determine whether they are highlight segments or not until the last segment is checked. After the checking of the last segment is completed, the highlights of the corresponding AV content can be played back. Summaries or previews may also be played back in the same manner as the highlights.

Figure 11:
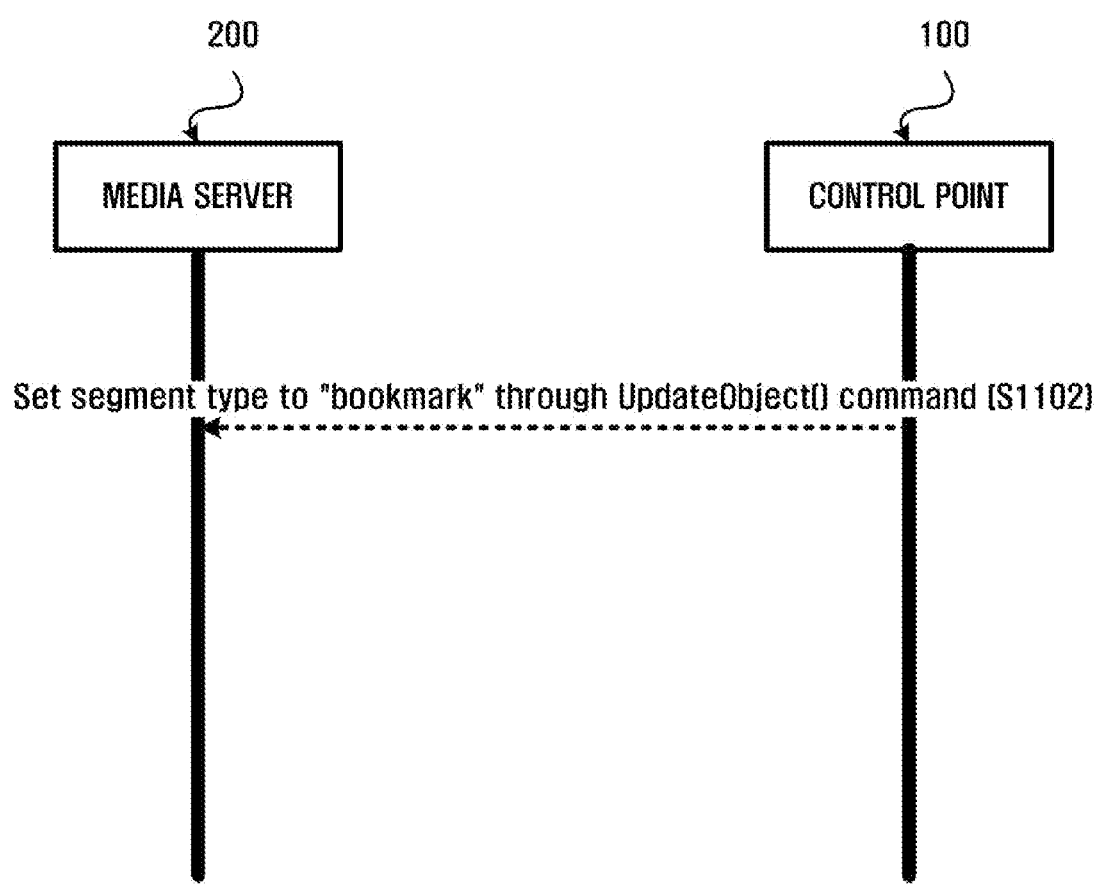
FIG. 11 is a diagram illustrating a procedure of selecting and bookmarking a predetermined segment of AV content according to a third embodiment of the present invention.

FIG. 11 is a diagram illustrating a procedure of selecting and bookmarking a predetermined segment of AV content according to a third embodiment of the present invention; and If a user issues a bookmarking (Favorites) command in the course of viewing a particular segment, the control point 100 sets a segment "type" attribute value on the media server 200 where the corresponding AV content is positioned to "bookmark" by issuing an UpdateObject( ) command in operation S1102. For example, if the segment "type" attribute value is set to "bookmark", i.e., , the corresponding segment is regarded as a bookmarked segment. Likewise, the procedure of deleting the bookmark of the corresponding segment is also performed by deleting "bookmark" from the "type" attribute value using the UpdateObject( ) command.

FIG. 12 is a diagram illustrating a procedure of generating a playlist including predetermined segments of AV content and adding a segment to the playlist, according to a fourth embodiment of the present invention.

First, a user issues a command to add a segment of particular AV content to a playlist on the media server 200 in operation S1202. The control point 100 checks whether the playlist exists in the media server 200 in operation S1204. If the playlist does not exist in the media server 200, a playlist is created in operation S1206. After the playlist is created, or if the playlist exists in the media server 200 (YES in operation S1204), the control point 100 checks whether the playlist contains a reference object for the AV content including the segment to be added in operation S1208. If the reference object is not contained in the playlist, a reference object is created and then included in the playlist in operation S1210. The reference object is created using the CreateReference( ) action of the UPnP CDS. After the reference object is created, or if the reference object is contained in the playlist (YES in operation S1208), the segment selected by the user is added to the reference object using the UpdateObject( ) action of the UPnP CDS in operation S1212.

Meanwhile, those of ordinary skill in the art will appreciate that the method for executing the AV content in segment units according to an embodiment of the present invention may be applied to recording media provided in a form that is computer-readable and having computer programs for executing the method in a computer system.

The present invention provides at least one of the following advantages:

First, a user can search for or navigate particular content in segment units in order to play back the same.

Second, a particular segment of AV content can be selectively played back and highlight, summary, and/or preview functions can be utilized.

Third, a particular segment of AV content can be selected and bookmarked and the bookmarked segment can then be viewed again at a later time.

Fourth, a playlist containing particular segments of AV content can be created and played back.

The effects of the present invention should not be limited to the foregoing description, and additional effects and advantages of the invention will be made more apparent to those skilled in the art from the spirit and scope of the invention as defined by the appended claims.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A method for executing AV content in segment units, the method comprising:
   extracting, by a control point, segment-related information about each of segments, which have a same attribute with each other, among a plurality of segments constituting a single audio/video (AV) content file stored in a first AV device, wherein the extracted segment-related information includes location information about a key frame image of each of the segments, the key frame image being a representative image of a corresponding segment of the segments, and the plurality of segments are stored in the first AV device in segment units and segment-related information about each of the plurality of segments is stored in the first AV device, and wherein each of the plurality of segments includes a plurality of attributes and the same attribute is an attribute selected from the plurality of attributes;
   fetching, by the control point, key frame images of the segments from the first AV device using the location information included in the extracted segment-related information; and controlling, by the control point, a second AV device to execute the AV content file using the extracted segment-related information in segment units,
wherein the controlling the second AV device comprises controlling the second AV device to arrange and display the segments in a time sequence together with the key frame images,
wherein the controlling of the second AV device comprises:
extracting, by the control point, URI (Uniform Resource Identifier) information of the AV content file, and start position information of the segments to be played back among the plurality of segments constituting the AV content file and transmitting the extracted URI information and the start position information to the second AV device; and
executing, by the second AV device, the segments from the AV content file stored in the first AV device using the URI information and the start position information.

2. The method of claim 1, wherein the first AV device is a media server storing the AV content file and providing a content directory service (CDS), and the second AV device is a media renderer playing back the AV content file.

3. The method of claim 1, wherein the segment related information includes an element <upnp:segment> having a title representing the corresponding segment as an attribute value.

4. The method of claim 3, wherein the element has various attributes of "creator", "type", "keywords", "segmentLocator" and "keyFrameLocator", wherein "creator" indicates a creator of the segment, "type" indicates a group to which the segment belongs, the group having highlight, summary, preview or bookmark playback as an attribute value, "keywords" indicates keywords related to the segment, "segmentLocator" indicates a start position and a length of the segment, and "keyFrameLocator" indicates a position of a key frame representing the segment.

5. The method of claim 1, wherein the executing of the segments comprises displaying one of a Highlight segment, a Summary segment, and a Preview segment in the AV content file.

6. The method of claim 1, wherein the controlling of the second AV device to execute the AV content file using the extracted segment-related information in the segment units comprises:
calling the first AV device to request an adding command or deleting command for adding or deleting bookmark information about a particular segment; and
adding or deleting, by the first AV device, the bookmark information about the particular segment in response to the command.

7. The method of claim 6, wherein the bookmark information is created by setting a type value of a segment element by an UpdateObject( ) command.

8. The method of claim 1, wherein the controlling of the second AV device to execute the AV content file using the extracted segment-related information in the segment units comprises:
determining whether or not a reference object for AV content file including the segment selected by a user already exists in a playlist of the first AV device; and
if it is determined that the reference object already exists in the playlist of the first AV device, adding the segment to the reference object, and if not, creating the reference object and then adding the segment to the created reference object.

9. A control point device for executing AV content in segment units comprising:
a segment searching unit that searches for segments, which have a same attribute with each other, among a plurality of segments constituting a single AV content file stored in a media server by extracting segment-related information about each of the segments from the media server, wherein the extracted segment-related information includes location information about a key frame image of each of the segments, the key frame image being a representative image of a corresponding segment of the segments, and the plurality of segments are stored in the media server in segment units and segment-related information about each of the plurality of segments is stored in the media server, and wherein each of the plurality of segments includes a plurality of attributes and the same attribute is an attribute selected from the plurality of attributes; and
a segment playback unit playing back the searched segments by controlling the media server and a media renderer,
wherein the segment searching unit fetches key frame images of the segments from the media server using the location information included in the extracted segment-related information and the segment playback unit controls the media renderer to arrange and display the segments in a time sequence together with the key frame images,
wherein the segment playback unit executes the searched segments using URI (Uniform Resource Identifier) information of the AV content file and start position information of the searched segments such that the URI (Uniform Resource Identifier) information of the AV content file and the start position information of the searched segments are extracted and transmitted to the media renderer.

10. The control point device of claim 9, wherein the segment searching unit searches for the segments by extracting at least one piece of information included in the segments selected from key frame information, keyword information, start position information and length information.

11. The control point device of claim 9, wherein the segment playback unit executes one of a Highlight segment, a Summary segment, and a Preview segment in the AV content file.

12. The control point device of claim 9, further comprising a bookmark creator calling the media server to request addition or deletion of bookmark information about a particular segment.

13. The control point device of claim 12, wherein the bookmark information is created by setting a type value of a segment element by an UpdateObject( ) command.

14. The control point device of claim 9, further comprising a playlist management unit creating a playlist including one or more segments selected by a user in the media server.

15. The control point device of claim 14, wherein the playlist management unit determines whether or not a reference object for AV content file including the segment selected by the user already exists in the playlist, and if it is determined that the reference object already exists in the playlist, adds the segment to the reference object, and if not, creates the reference object and then adds the segment to the created reference object.

16. The control point device of claim 9, wherein the segment-related information includes an element <upnp:segment> having a title representing the corresponding segment as an attribute value.

17. The control point device of claim 16, wherein the element has various attributes of "creator", "type", "keywords", "segmentLocator" and "keyFrameLocator", wherein "creator" indicates a creator of the segment, "type" indicates a group to which the segment belongs, the group having highlight, summary, preview or bookmark playback as an attribute value, "keywords" indicates keywords related to the segment, "segmentLocator" indicates a start position and a length of the segment, and "keyFrameLocator" indicates a position of a key frame representing the segment.

18. A home network system for executing AV content in segment units comprising:
  a media server storing a single AV content file including a plurality of segments in segment units and segment-related information about each of the plurality of segments;
  a media renderer executing the AV content file in segment units; and
  a control point including a segment searching unit that searches for segments, which have a same attribute with each other, among the plurality of segments constituting the AV content file by extracting segment-related information of each of the segments from the media server, wherein the extracted segment-related information includes location information about a key frame image of each of the segments, the key frame image being a representative image of a corresponding segment of the segments, and the segment searching unit fetches key frame images of the segments from the media server using the location information included in the extracted segment-related information, and a segment playback unit playing back the searched segments by controlling the media server and the media renderer, wherein each of the plurality of segments includes a plurality of attributes and the same attribute is an attribute selected from the plurality of attributes, and the segment playback unit controls the media renderer to arrange and display the segments in a time sequence together with the key frame images,
  wherein the segment playback unit executes the searched segments using URI (Uniform Resource Identifier) information of the AV content the and start position information of the searched segments such that the URI (Uniform Resource Identifier) information of the AV content file and the start position information of the searched segments are extracted and transmitted to the media renderer.

19. The home network system of claim 18, wherein the segment searching unit searches for the segments by extracting at least one piece of information included in the segments selected from key frame information, keyword information, start position information and length information.

20. The home network system of claim 18, wherein the segment playback unit executes one of a Highlight segment, a Summary segment, and a Preview segment in the AV content file.

21. The home network system of claim 18, wherein the control point further comprises a bookmark creator calling the media server to request addition or deletion of bookmark information about a particular segment.

22. The home network system of claim 18, wherein the control point further comprises a playlist management unit creating a playlist including one or more segments selected by a user in the media server.

23. The home network system of claim 22, wherein the playlist management unit determines whether or not a reference object for the AV content file including the segment selected by the user already exists in the playlist, and if it is determined that the reference object already exists in the playlist, adds the segment to the reference object, and if not, creates the reference object and then adds the segment to the created reference object.

24. The home network system of claim 18, wherein the media server comprises:
  a metadata management unit collecting the segment-related information to be stored in a database, and reflecting added, deleted, or changed data in the segment-related information, if any, in the database for updating the information; and
  a content directory service (CDS) unit supplying the control point with the segment-related information through a predetermined protocol to allow the control point to add, delete, or change the segment-related information.

25. The home network system of claim 24, wherein the segment related information includes an element <upnp:segment> having a title representing the corresponding segment as an attribute value.

26. The home network system of claim 25, wherein the element has various attributes of "creator", "type", "keywords", "segmentLocator" and "keyFrameLocator", wherein "creator" indicates a creator of the segment, "type" indicates a group to which the segment belongs, the group having highlight, summary, preview or bookmark playback as an attribute value, "keywords" indicates keywords related to the segment, "segmentLocator" indicates a start position and a length of the segment, and "keyFrameLocator" indicates a position of a key frame representing the segment.

27. The home network system of claim 18, wherein the control point is integrally formed with the media server or the media renderer.

28. A non-transitory computer-readable recording medium having program codes for causing a computer to perform a method for executing AV content in segment units, the method comprising:
  extracting, by a control point, segment-related information about each of segments, which have a same attribute with each other, among a plurality of segments constituting a single audio/video (AV) content file stored in a first AV device, wherein the extracted segment-related information includes location information about a key frame image of each of the segments, the key frame image being a representative image of a corresponding segment of the segments, and the plurality of segments are stored in the first AV device in segment units and segment-related information about each of the plurality of segments is stored in the first AV device, and each of the plurality of segments includes a plurality of attributes and the same attribute is an attribute selected from the plurality of attributes;
  fetching key frame images of the segments from the first AV device using the location information included in the extracted segment-related information; and
  controlling, by the control point, a second AV device to execute the AV content file using the extracted segment-related information in segment units,
  wherein the controlling the second AV device comprises controlling the second AV device to arrange and display the segments in a time sequence together with the key frame images,
  wherein the controlling of the second AV device comprises:
  extracting, by the control point, URI (Uniform Resource Identifier) information of the AV content file, and start position information of the segments to be played back among the plurality of segments constituting the AV content file and transmitting the extracted URI information and the start position information to the second AV device; and executing, by the second AV device, the segments from the AV content file stored in the first AV device using the URI information and the start position information.

* * * * *